United States Patent [19]

Hristodulidis

[11] Patent Number: 5,415,197

[45] Date of Patent: May 16, 1995

[54] EQUALIZING RESERVOIR CONFIGURATION, ESPECIALLY FOR COOLING CIRCUITS IN NUCLEAR POWER STATIONS

[75] Inventor: Adonios Hristodulidis, München, Germany

[73] Assignee: Siemens Aktiengesellschaft, Munich, Germany

[21] Appl. No.: 191,877

[22] Filed: Feb. 4, 1994

[30] Foreign Application Priority Data

Aug. 13, 1991 [DE] Germany .................. 41 26 758.3

[51] Int. Cl.⁶ ............................................. G21C 9/004
[52] U.S. Cl. .................................... 137/207; 376/283; 376/307
[58] Field of Search ............ 137/247.25, 207, 247; 376/283, 307

[56] References Cited

U.S. PATENT DOCUMENTS 4,728,486  3/1988  Kish ............................. 376/283 X

FOREIGN PATENT DOCUMENTS 1061989  7/1959  Germany .
2951458  1/1983  Germany .
3902258  8/1990  Germany .
 998238  2/1983  U.S.S.R. .

Primary Examiner—Gerald A. Michalsky
Attorney, Agent, or Firm—Herbert L. Lerner; Laurence A. Greenberg

[57] ABSTRACT

An equalizing reservoir configuration for fluid circuits with volume and/or pressure fluctuations, especially for cooling circuits in nuclear power stations, includes an equalizing reservoir communicating with a fluid circuit through a fluid line connected to a base of the equalizing reservoir, so that a lower fluid chamber and an upper gas buffer chamber form in the equalizing reservoir. An upper end of an equalizing riser opens into the gas buffer chamber and runs out into a U-tube containing a water/air seal and being disposed beneath the equalizing reservoir. This provides a slim construction for narrow spaces and an increase in the air volume of the equalizing reservoir.

6 Claims, 2 Drawing Sheets

EQUALIZING RESERVOIR CONFIGURATION, ESPECIALLY FOR COOLING CIRCUITS IN NUCLEAR POWER STATIONS

CROSS-REFERENCE-TO-RELATED APPLICATION

This application is a Continuation of International Application Ser. No. PCT/DE92/00666, filed Aug. 11, 1992.

BACKGROUND OF THE INVENTION

FIELD OF THE INVENTION

The invention relates to an equalizing reservoir configuration for fluid circuits with volume and/or pressure fluctuations, especially for cooling circuits in nuclear power stations.

Open cooling circuits in nuclear power stations, such as intermediate cooling circuits in pressurized-water nuclear power stations, require equalizing reservoirs which can receive or discharge fluid, for absorbing fluctuations in the coolant volume, which result from operation. In order to prevent inadmissible pressure fluctuations in the system in such a case, on one hand the equalizing reservoirs must be connected to the atmosphere, in order to be able to "breathe" and, if necessary, ensure an overflow. On the other hand, however, direct access of the exterior air into the fluid present in the equalizing reservoir must be prevented, so that no chemical reactions with the exterior air and the cooling water in the reservoir can proceed. For reasons of corrosion protection, the cooling water generally contains hydrazine which might be degraded by carbon dioxide and atmospheric oxygen.

German Patent DE 29 51 458 C2 discloses an equalizing reservoir, especially for fluid circuits with volume fluctuations in nuclear power stations, which includes a fluid chamber. The latter is connected to the fluid circuit through a fluid line starting from the base of the reservoir. There is a gas chamber or a gas buffer chamber above the fluid chamber. The fluid chamber of the equalizing reservoir communicates with a fluid riser, which extends at least up to the maximum height of the upper side of the equalizing reservoir and contains a water/air seal. The fluid riser is bent, preferably in the form of an S. In other words, the upper end of the riser is formed in the shape of a U. That prevents dirt from dropping in and allows overflowing quantities of fluid to be caught.

The invention of the instant application begins from the realization that, in the known equalizing reservoir, the equalizing volume given by the fluid riser is still relatively small. Level monitoring of the equalizing reservoir is therefore relatively involved, because under all circumstances it must be avoided that the liquid riser is sucked dry in the event of pressure fluctuations in the direction of the reduced pressure and the level of the water seal in the equalizing reservoir thus falls. The fluid riser, which is bent in the shape of an S and which extends laterally and into a space above the reservoir, requires a relatively large absorption volume which is not always available in narrow interspaces in a nuclear power station.

SUMMARY OF THE INVENTION

It is accordingly an object of the invention to provide an equalizing reservoir configuration, especially for cooling fluid circuits in nuclear power stations with volume and/or pressure fluctuations of the type defined at the outset, which overcomes the hereinafore-mentioned disadvantages of the heretofore-known devices of this general type, which has an equalizing riser that can be disposed in a substantially more space-saving manner and which has a substantially greater storage volume than in the known reservoir, so that level monitoring of a fluid level in the equalizing reservoir can be made simpler and an air seal can be achieved in every case.

With the foregoing and other objects in view there is provided, in accordance with the invention, an equalizing reservoir configuration for fluid circuits with volume and/or pressure fluctuations, especially for cooling circuits in nuclear power stations, comprising a fluid line to be connected to a fluid circuit; an equalizing reservoir having a base connected to the fluid line for forming a lower fluid chamber and an upper gas buffer chamber in the equalizing reservoir; an equalizing riser having an upper end opening into the gas buffer chamber; and a U-tube into which the equalizing riser runs out, the U-tube being filled with an air-sealing water seal and being disposed or fitted beneath the equalizing reservoir.

The advantages achievable through the use of the invention are above all that the assembly work for the novel equalizing reservoir configuration can, for the most part, be carried out in easily accessible spaces, because the equalizing riser extends from the reservoir deeply downwards, for example 25 m, up to its transition into the U-tube containing the water/air seal.

In accordance with another feature of the invention, there is provided a measuring instrument for monitoring the level of the water seal in the U-tube and a feeding device, which can be activated in accordance with a measured value, for feeding replenishing water into the U-tube through a feeding valve, when the level falls below a set value. This ensures an air seal at all times. The U-tube can be installed, separately from the equalizing riser, in easily accessible spaces. On one hand, this is due to the large distance from the equalizing reservoir and, on the other hand, this is due to the fact that there is no fluid connection between the equalizing reservoir and the U-tube. This facilitated assembly is a great advantage, particularly in the retrofitting of existing plants. The extended equalizing riser is subject to virtually no restriction with respect to length, cross-section and lay out.

In accordance with a further feature of the invention, there is provided a buffer vessel which increases the gas volume of the equalizing riser and is connected between the equalizing riser and the U-tube. The U-tube has, for example, a height of 5 m, and the equalizing reservoir itself, which is in general mounted in an inclined position, spans a height difference of, for example, 8 to 10 m.

In accordance with an added feature of the invention, the equalizing reservoir has a top wall, and the equalizing riser passes through the base of the equalizing reservoir in a sealed manner and extends in the equalizing reservoir through the fluid chamber and the gas buffer chamber and has an open end near the top wall of the equalizing reservoir.

In accordance with a concomitant feature of the invention, the equalizing reservoir has an upper region surrounding the gas buffer chamber, the equalizing riser is a connecting line being attached to the outside of the equalizing reservoir in the upper region, and the connecting line is disposed with a gradient down to the lower U-tube and is connected directly or through the buffer vessel to the lower U-tube.

Other features which are considered as characteristic for the invention are set forth in the appended claims.

Although the invention is illustrated and described herein as embodied in an equalizing reservoir configuration, especially for cooling circuits in nuclear power stations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
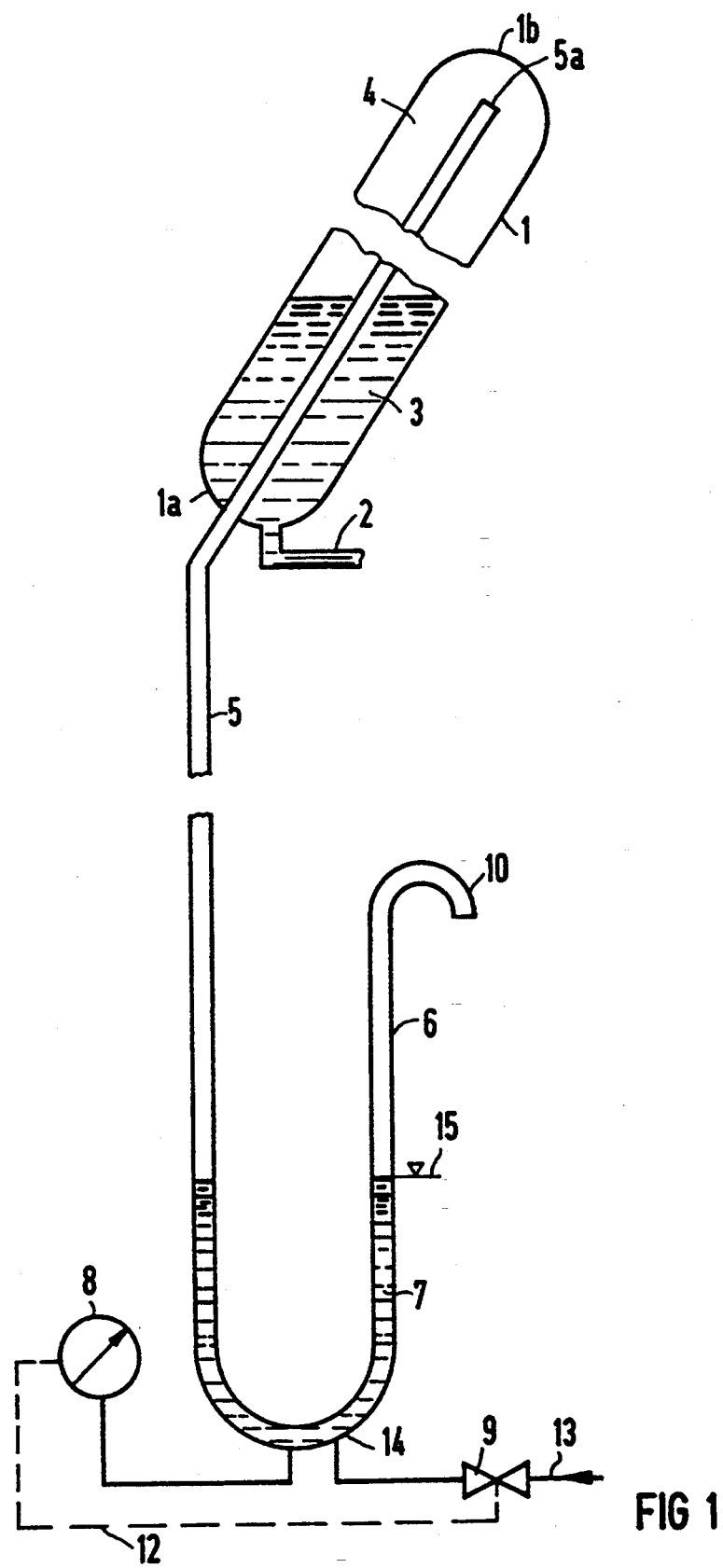
FIG. 1 is a fragmentary, diagrammatic, elevational view of a first embodiment of an equalizing reservoir with an equalizing riser in its interior which extends downwards through a reservoir base to a U-tube containing a water/air seal.

Referring now to the figures of the drawing in detail and first, particularly, to FIG. 1 thereof, there is seen an equalizing reservoir 1 which communicates through a fluid line 2 connected to a base 1a of the equalizing reservoir 1 with a fluid circuit of a nuclear reactor installation that is not shown in more detail. The fluid circuit can be an intermediate cooling circuit. The equalizing reservoir is disposed in such a way that a lower fluid chamber 3 and an upper gas buffer chamber 4 are formed therein. An equalizing riser 5 has an upper open end 5a that opens into the gas buffer chamber 4 and runs out into a U-tube 6 that contains an air-sealing water seal or water/air seal 7 and is disposed beneath the equalizing reservoir 1. The U-tube 6 has a downwardly curved, U-shaped end in the form of a bent outlet 10. Through the use of a measuring instrument 8, the level of the water/air seal 7 can be monitored by measuring the water column. The measuring instrument 8 is operatively connected to a remote-controlled feeding valve 9, as is symbolized by a dashed action, working or application line 12 representing a feeding device, in such a way that pressurized replenishing water can be fed from a line 13 through the valve 9 and through a connection 14 into the U-tube 6, when a level 15 falls below a set value.

The fluid chamber 3 in the equalizing reservoir 1 is subject to system-related volume fluctuations. In general, the fluid in the fluid chamber 3 is so-called deionized water, above which is the gas buffer chamber 4, which follows the volume fluctuations of the fluid chamber 3. In accordance with structural conditions, the U-tube 6 can be installed at a great distance and substantially lower than the equalizing reservoir 1, for example about 40 m lower than the upper end of the equalizing riser 5. In order to avoid access of exterior air to the system fluid, the U-tube is filled up to a certain height (the height level 15) with barrier fluid which is preferably identical to the system fluid and forms the water/air seal 7. Provision is made for an overflow of the barrier fluid of the water/air seal 7 through the outlet 10 in the case of a high excess pressure in the equalizing reservoir 1. The equalizing riser 5 is brought through the base 1a of the equalizing reservoir 1 in a sealed manner and extends in the equalizing reservoir 1 through the fluid chamber 3 and the gas buffer chamber 4, with its open end 5a being located near a top wall 1b of the equalizing reservoir 1.

Figure 2:
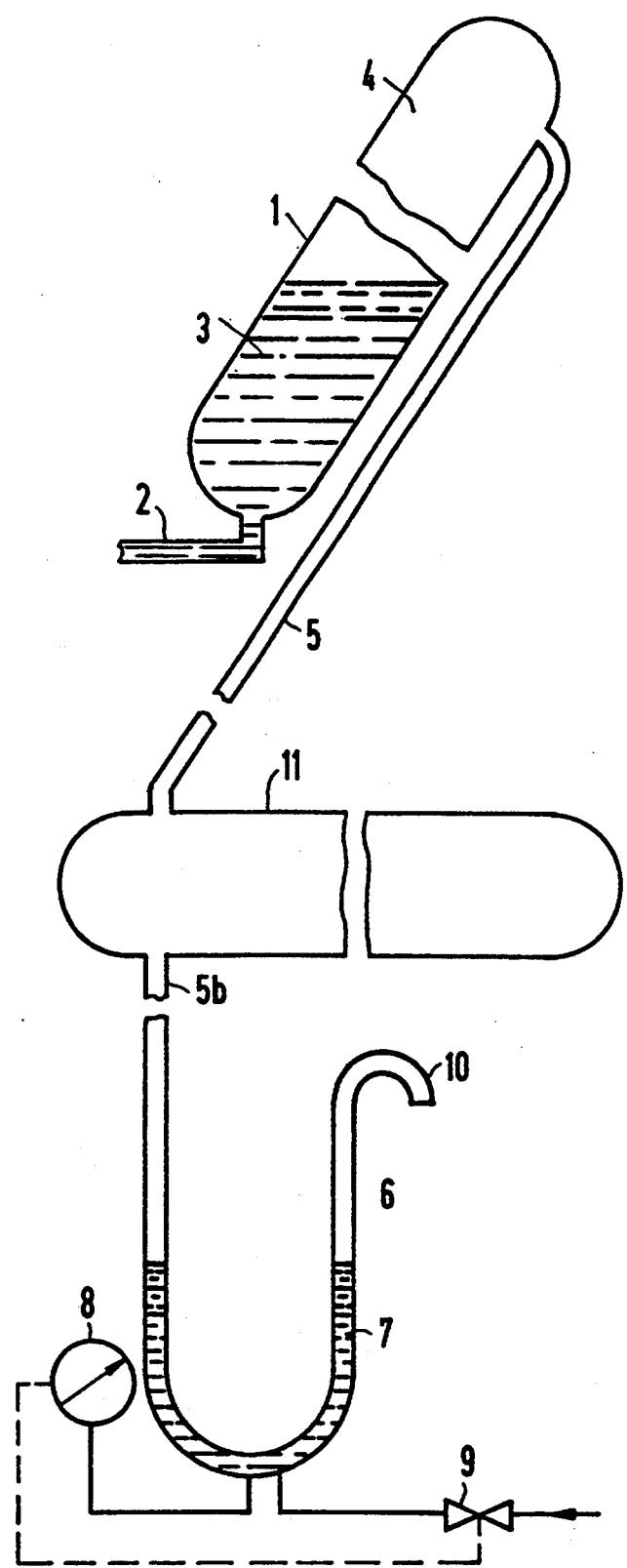
FIG. 2 is a view similar to FIG. 1 of a second embodiment of an equalizing reservoir in which the equalizing riser is constructed as a connecting line that is attached to the equalizing reservoir in an upper region thereof which surrounds a gas buffer chamber, wherein the connecting line is laid with a gradient down to a buffer vessel that increases the storage volume, and the U-tube adjoins an underside of the buffer vessel through the connecting line.

In the embodiment according to FIG. 2, a horizontally installed buffer vessel 11, which increases the gas volume of the equalizing riser 5, is connected between the equalizing riser 5 and the U-tube 6. The buffer vessel 11 could also be disposed in an upright condition. Pressure fluctuations in the system are moderated by the increased, compressible gas volume. In order to avoid building up fluid in the buffer vessel 11, a connecting line 5b leading to the U-tube 6 is connected to the lowest point of the buffer vessel 11. In addition, the embodiment according to FIG. 2 differs from that according to FIG. 1 by the fact that the equalizing riser 5 is constructed as a connecting line which is attached to the outside of the equalizing reservoir 1 in an upper region thereof which surrounds the gas buffer chamber 4, wherein the connecting line is laid with a gradient down to the lower U-tube 6, with the buffer vessel 11 being inserted into the line lay out 5–5b in the lower region.

I claim:

1. An equalizing reservoir configuration for fluid circuits with volume and/or pressure fluctuations, comprising:
   a) a fluid line to be connected to a fluid circuit;
   b) an equalizing reservoir having a base connected to said fluid line for forming a lower fluid chamber and an upper gas buffer chamber in said equalizing reservoir;
   c) an equalizing riser having an upper end opening into said gas buffer chamber and a supplementary gas buffer chamber in said equalizing riser for equalizing volume and/or pressure fluctuations; and
   d) a U-tube into which said equalizing riser runs out, said U-tube being filled with an air-sealing water seal and being disposed beneath said equalizing reservoir.

2. The equalizing reservoir configuration according to claim 1, including a measuring instrument for monitoring a level of said water seal in said U-tube and supplying a measured value, a feeding valve connected to said U-tube, and a feeding device being connected to said measuring instrument and to said feeding valve and being activated as a function of the measured value for feeding replenishing water into said U-tube through said feeding valve when the level falls below a set value.

3. The equalizing reservoir configuration according to claim 1, including a buffer vessel connected between said equalizing riser and said U-tube for increasing a gas volume of said equalizing riser.

4. The equalizing reservoir configuration according to claim 3, wherein said equalizing reservoir has an upper region surrounding said gas buffer chamber, said equalizing riser is a connecting line being attached to the outside of said equalizing reservoir in said upper region, and said connecting line is disposed with a gradient down to and is connected through said buffer vessel to said lower U-tube.

5. The equalizing reservoir configuration according to claim 1, wherein said equalizing reservoir has a top wall, and said equalizing riser passes through said base of said equalizing reservoir in a sealed manner and extends in said equalizing reservoir through said fluid chamber and said gas buffer chamber and has an open end near said top wall of said equalizing reservoir.

6. The equalizing reservoir configuration according to claim 1, wherein said equalizing reservoir has an upper region surrounding said gas buffer chamber, said equalizing riser is a connecting line being attached to the outside of said equalizing reservoir in said upper region, and said connecting line is disposed with a gradient down to and is connected with said lower U-tube.

* * * * *